Dec. 14, 1926.  
C. N. TAYLOR  
HAYSTACKER  
Filed April 27, 1925    4 Sheets-Sheet 2
1,610,393
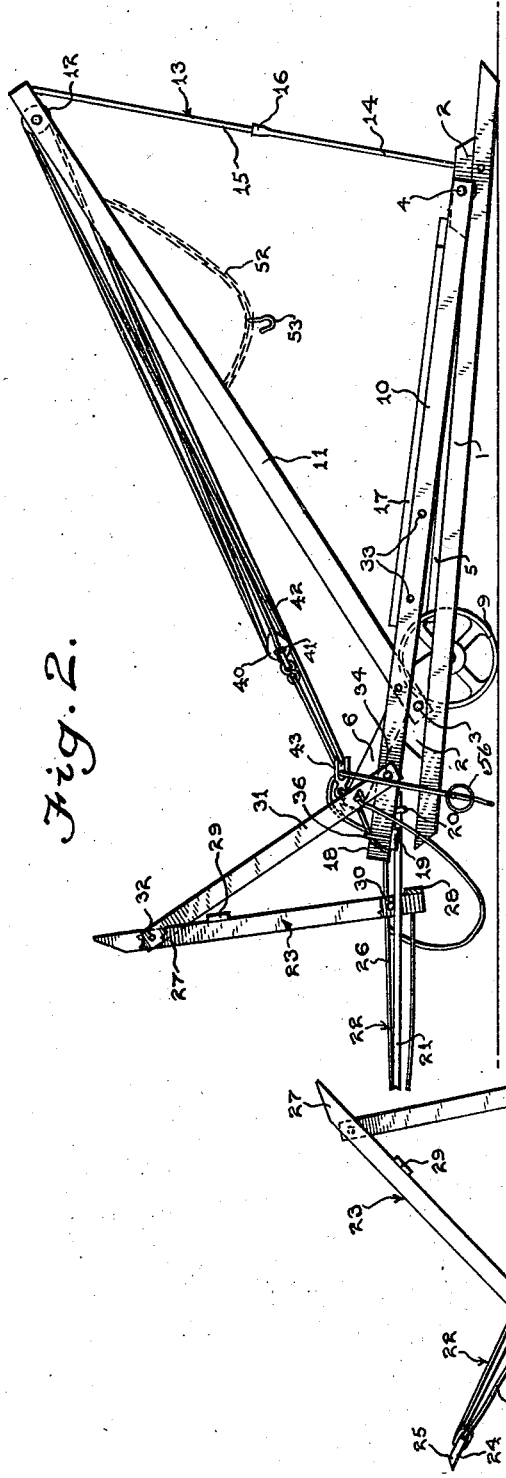
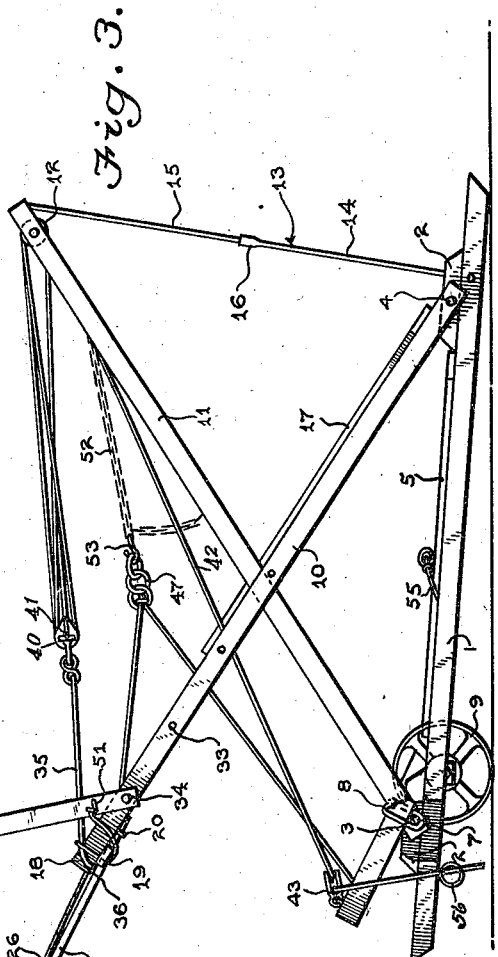
Inventor  
C. N. Taylor

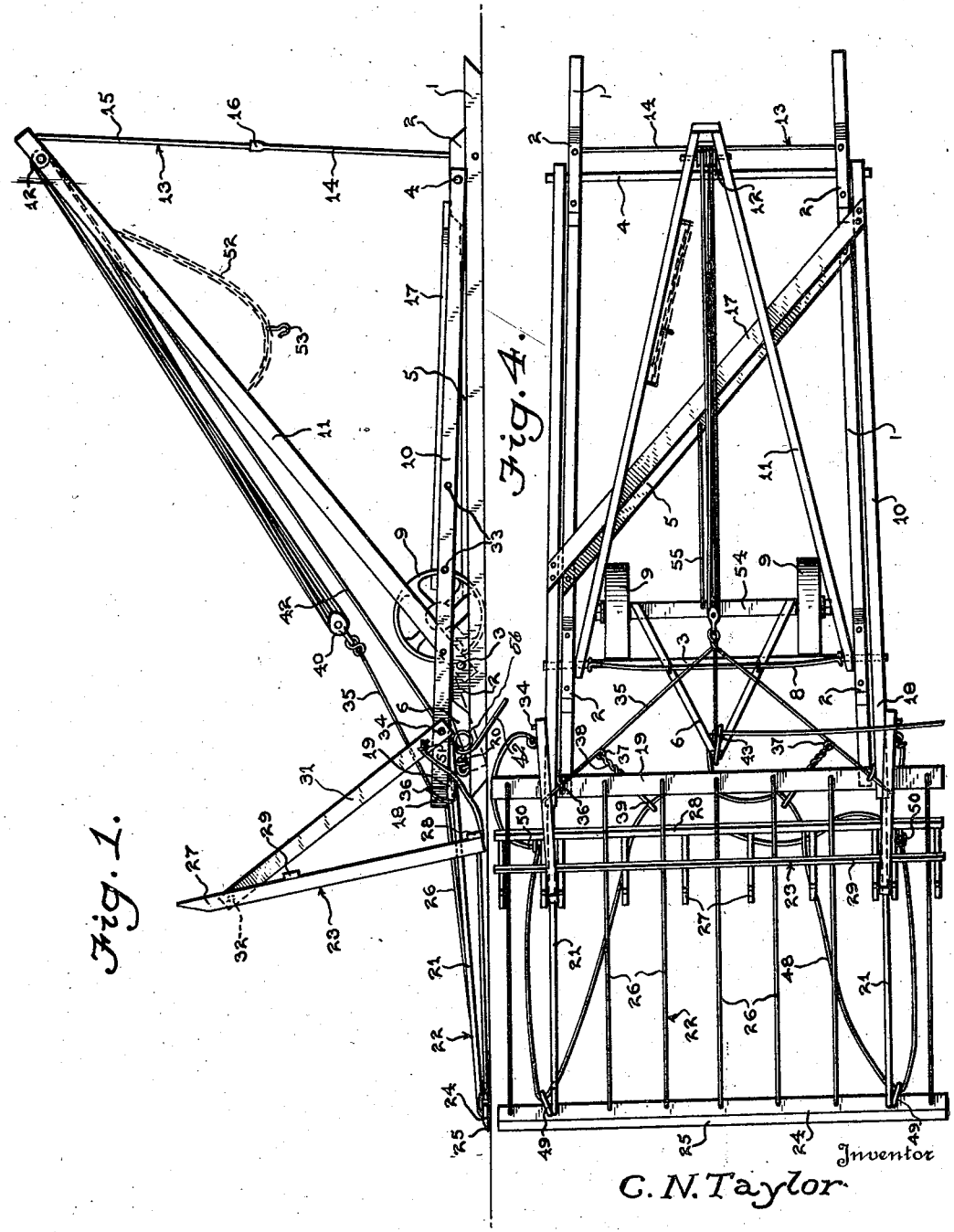

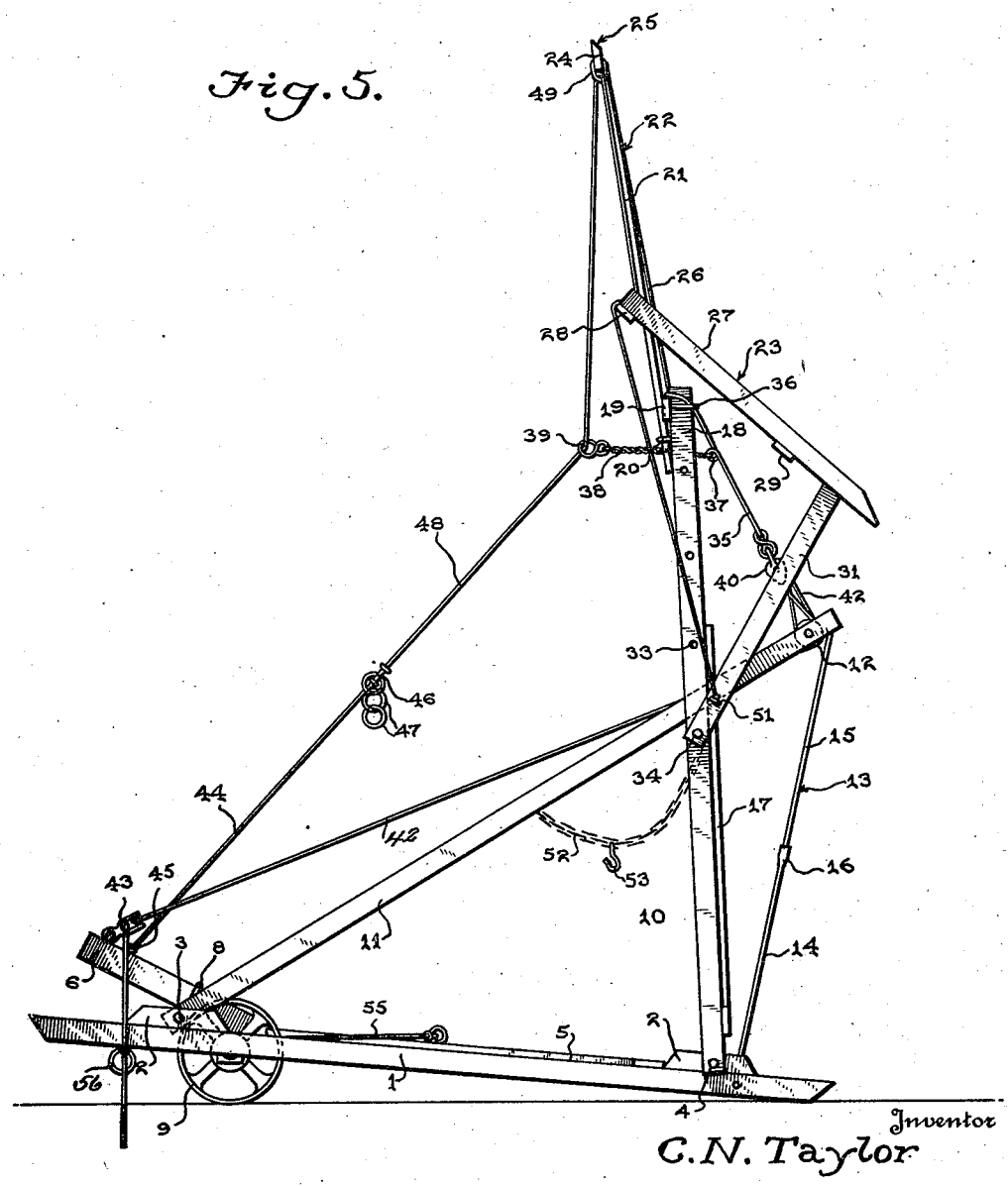

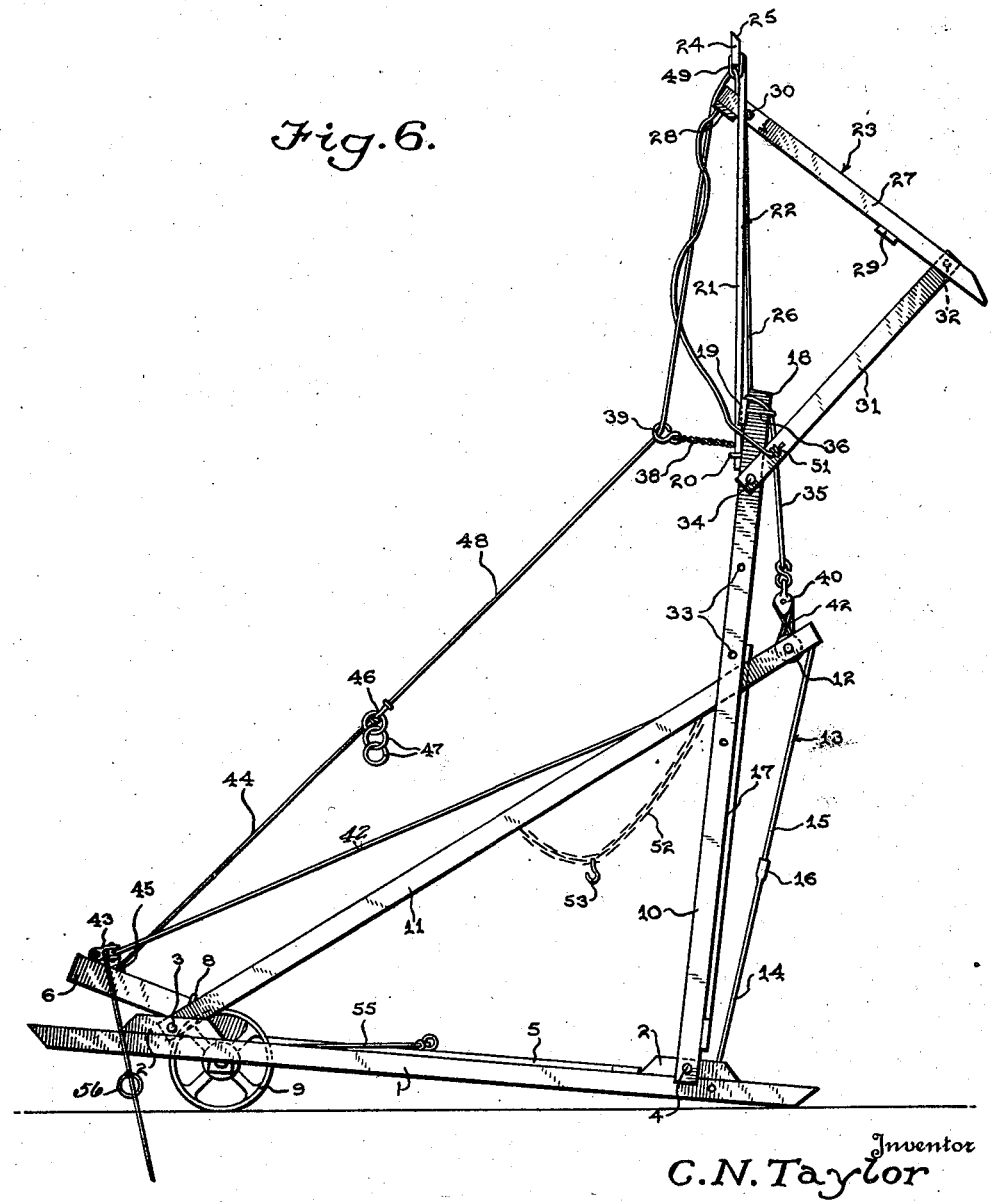

Patented Dec. 14, 1926.

1,610,393

UNITED STATES PATENT OFFICE.

CHARLES N. TAYLOR, OF HEMINGFORD, NEBRASKA.

HAYSTACKER.

Application filed April 27, 1925. Serial No. 26,208.

It is the purpose of the present invention to provide a stacker which may preferably be disposed adjacent the hay stack so that a suitable sweep of any conventional construction may be used to draw the hay toward and deposit it upon the stacker, whereby it may be subsequently elevated to the top of the stack.

Another purpose is the provision of a stacker including a frame and a boom and an elevating or hoisting frame carrying a fork (which includes a stationary part and a movable portion) in conjunction with means operatively connecting the boom and the elevating frame whereby, when the hay is deposited upon the fork, the hay may be hoisted or elevated toward and deposited upon the top of the stack.

Still another purpose is to provide a fork wherein its movable portion is adjustable for dumping the hay near the stack from a relatively low elevation and farther from the stack from a higher elevation of the hay.

A further purpose is to provide an improved fork whereby the stacker teeth upon which the hay is ordinarily deposited by a sweep may be eliminated.

A still further purpose is the provision of a tilting frame with a double use, namely, for supporting the stacker upon wheels for moving from stack to stack or from one job to another, and for pulling the elevating frame back from a balanced vertical position after dumping the hay upon the stack.

It is to be understood that the particulars herein given are in no way limitative and that, while still keeping within the scope of the invention, any desired modifications of details and desired proportions may be made in the apparatus according to the circumstances.

The invention comprises further features and combinations of parts to be hereinafter set forth, shown in the drawings and claimed.

In the drawings:

Figure 1 is a side elevational view of the invention positioned to begin operation.

Figure 2 is a view similar to Figure 1 showing the first portion of the operating movement.

Figure 3 is a view similar to Figure 1 but showing the parts arranged as when the mechanism is to be transported.

Figure 4 is a plan view of the structure shown in Figure 1.

Figure 5 is a side elevational view showing the apparatus disposed in discharging position at a low level.

Figure 6 is a view similar to Figure 5 but showing the discharging position at a high level.

Referring to the drawings, 1 designates a base frame, in bearings 2 of which, at opposite ends, fulcrum rods 3 and 4 are mounted. The sides of the base frame are reinforced by an angular beam 5. A triangular frame 6 is mounted upon the rod 3 as by means of bearings 7. The frame 6 carries supporting wheels 9 and in the position of the stacker as in Figure 1, the base frame 1 rests upon the ground and the converging ends of frame 6 rest upon the ground.

However, when the hoisting or elevating frame 10 (which is fulcrumed upon the rod 4) tensions the rope or cable 44 during its movement from its lowered position to its extreme perpendicular position, the frame 6 assumes the position shown in Figure 2 with the base frame elevated from the ground at one end.

A boom 11 is pivotally mounted upon the rod 3 and comprises angularly arranged sides, and carried by the converging ends of the sides of said boom is a double sheaved pulley 12. The boom is held in an elevated position by means of a rope or cable 42, the ring 56 on rope 42 preventing the rope 42 from running farther through pulley 43 than to allow the complete lowering of the elevating frame. The cable 13 connected to the upper end of the boom and diverging at 16 and again connected to the sides of the base frame aids in holding the boom in position during the elevating operation of the stacker.

The sides of the hoisting or elevating frame are reinforced by an angular brace 17. The ends of the sides of the hoisting or elevating frame are reinforced by a transverse brace 19 and carry the side rods 21 of the stationary part of the hay fork. The hay fork comprises the stationary part 22 and the movable portion 23. The rods 21 of the stationary portion of the hay fork have their extremities connected by a bar 24 which is beveled, as at 25. The bar 24 enables the hay to readily deposit upon the fork. A plurality of relatively heavy wires 26 connect the bar 24 and the brace 19. These wires support the hay as it is elevated by the fork.

The movable section of the fork comprises a plurality of teeth 27 which are connected and reinforced by the bars 28 and 29. Certain of the teeth 27 are spaced relatively closer together than the other teeth sufficiently to permit the movable portion of the fork to be guided upon the rods 21 of the fixed part of the fork. Extending across and connecting the relatively closer together teeth of the movable portion of the fork are short rods or pins 30 to further assist in guiding the movable portion of the fork. In fact, the rods 21 are disposed between the bar 28 and the rods or pins 30. Links 31 are pivotally connected at 32 between the relatively closer together teeth of the movable portion of the fork and are, in turn, operatively mounted upon the sides of the hoisting or elevating frame 10. The sides of the hoisting or elevating frame 10 have a plurality of openings or apertures 33 in any axially opposite ones of which the pivot pins 34 (which operatively connect the links 31 to the sides of the frame 10) may be adjusted for the purpose of holding the movable portion of the fork in different adjusted positions, that is, angularly.

Angularly arranged rods 35 are connected at 36 to the ends of the sides of the frame 10 and have eyes 37 in which ropes or cables 38 are connected. The ends of the ropes or cables have guide eyes 39, and connected to the converging ends of the rods 35 is a pulley 40 and connected to the casing of the pulley, as at 41, is a rope or cable 42 which passes over and engages one of the sheaves of the pulley 12 and then back over the pulley 40 and then over the other sheave of pulley 12. This cable then passes under a pulley 43 carried by the frame 6 and its end attached to any suitable hoisting device (not shown), the aim being that upon operating the hoisting device, the cable or rope 42 may be used for hoisting or lifting the frame 10.

A rope or cable 44 is attached to an eye 45 carried by the frame 6 and in a loop 46 of the cable 44 a series of links 47 are connected. Diverging from the loop 46 are ropes or cables 48 which pass through the guide eyes 39 and through guide eyes 49 carried by the bar 24. These ropes or cables 48 are, in turn, connected at 50 to bar 28 and again connected at 51 to the links 31, the connections 51 being a short distance from the pivot pins 34. The purpose of these ropes is to operate the tilting frame 6 and the movable part of the fork, and when connected by links 47 to hook 53, to hold the stacker in the position for traversing the field or road, as in Figure 5. The hook 53 is suspended from one side of the boom on loop rope or chain 52.

A cross-piece 54 constitutes a part of the frame 6 and connected to the cross-piece 54 and the brace 5 of the base frame 1 is a limiting chain or cable 55 which limits the rocking movement of the frame 6 during a period of hoisting the frame 10, that is, limiting the rocking movement of the frame 6 when the hoisting or elevating frame 10 reaches its extreme perpendicular position.

In the operation, the apparatus is first disposed as in Figure 1, preferably adjacent a stack or a place where the stack is to be built. When the fork is filled with hay the rope or cable 42 may be operated which will cause the hoisting or elevating frame 10 to tilt upwardly, the fork having been first disposed as in Figure 2, and this tilting or upward movement of the frame 10 may continue until it reaches a perpendicular position, as in Figure 6. In this case, possibly at a point midway the movement of frame 10, the rope or cable 44 and its branches begin to tension at points between frame 6 and where the branches are attached to the bar 28 of the movable portion of the fork, in which case the converging ends of frame 6 and the ends of base frame 1 will be raised from the ground, and the movable portion of the fork will then slide upon the rods 21 of the stationary part of the fork, and in this case the movable portion of the fork will assume a dumping position, as shown in Figure 6, allowing the hay to slide from the movable portion of the fork and upon the stack.

When the hay is dumped upon the stack, the hoisting tension of rope 42 is then released, and the end of the base frame, which in an elevating process, has been raised from the ground, settles back by gravity to its former position on the ground, and in settling, it pulls the elevating frame back from its balanced perpendicular position by means of frame 6 and rope 44. The stacker is then, by gravity, returned to its lowered position, as in Figure 1, when the fork is again filled with hay and the elevating process repeated. For the purpose of arranging to dump the hay from variable elevations, the links 31 may be adjusted relative to the sides of the frame 10. This adjustment is accomplished by connecting links 31 to different axially opposite apertures 33 in the sides of the frame 10. As this adjustment is made it effects the apparent length of rope 44 and when adjusted for the low elevation the elevating frame is checked in its lifting motion before reaching a perpendicular position, and dumps the hay from this position, as shown in Figure 5.

When it is desired to move the stacker from a finished stack or to traverse the field or road, hook 53 is engaged into one of the links 47 while the stacker is in its extreme elevated position, and the elevating frame 10 is then allowed to start on its return to the lowered position, during which return it is checked and held in a partially elevated position as shown in Figure 3. Frame 6 is then also held in a position to support one end of the base frame 1 on the wheels 9.

The invention having been described, what is claimed is:

1. A hay stacker comprising a pivotally mounted hoisting frame, a fork carried at the free end thereof and comprising fixed and movable elements, and means for elevating the hoisting frame and simultaneously actuating the movable element of the fork to eject the contents thereof, said movable element being adjustable to effect its operation for the ejection of the contents at a specified level.

2. A hay stacker comprising a pivotally mounted hoisting frame, a fork carried at the free end thereof and comprising fixed and movable elements, and means for elevating the hoisting frame and simultaneously actuating the movable element of the fork to eject the contents thereof, said movable element of the fork traversing the fixed element thereof.

3. A hay stacker comprising a pivotally mounted hoisting frame, a fork carried at the free end thereof and comprising fixed and movable elements, and means for elevating the hoisting frame and simultaneously actuating the movable element of the fork to eject the contents thereof, said movable element of the fork traversing the fixed element thereof and mounted on guides of the fixed element and having link connections with the hoisting frame.

4. A hay stacker comprising a pivotally mounted hoisting frame, a fork carried at the free end thereof and comprising fixed and movable elements, and means for elevating the hoisting frame and simultaneously actuating the movable element of the fork to eject the contents thereof, said movable element of the fork traversing the fixed element thereof and mounted on guides of the fixed element and having link connections with the hoisting frame, said link connections being adjustably connected with the hoisting frame longitudinally of the latter.

5. A hay stacker comprising a pivotally mounted hoisting frame, a fork carried at the free end thereof and comprising fixed and movable elements, and means for elevating the hoisting frame and simultaneously actuating the movable element of the fork to eject the contents thereof, the fixed element of the fork consisting of spaced transverse members and wires spanning the same.

6. A hay stacker comprising a pivotally mounted hoisting frame, a fork carried at the free end thereof and comprising fixed and movable elements, and means for elevating the hoisting frame and simultaneously actuating the movable element of the fork to eject the contents thereof, the fixed element of the fork consisting of spaced transverse members and wires spanning the same and the movable element traversing guides spanning said fixed members and being provided with teeth arranged in intercurrent relation with said wires.

7. In a hay stacker, a base frame, a boom mounted at one end thereof and adapted to move to an upwardly inclined position, a hoisting frame mounted on the other end of the base frame and adapted to move to a perpendicular position when delivering hay, the hoisting frame intersecting the boom, guides upon the hoisting frame, a fork movable on the guides with links connecting with the hoisting frame, and hoisting means operatively connecting the boom and the hoisting frame to move the latter to said perpendicular position, thereby positioning the fork to deposit hay on the stack.

8. In a hay stacker, a base frame, a boom mounted at one end thereof and adapted to move to an upwardly inclined position, a hoisting frame mounted on the other end of the base frame and adapted to move to a perpendicular position when delivering hay, the hoisting frame intersecting the boom, guides on the free end of the hoisting frame, a fork movable on the guides, links operatively connecting the fork and the sides of the hoisting frame, hoisting means operatively connecting the boom and the hoisting frame to move the latter to said perpendicular position, whereby the fork may be positioned over the stack to deposit hay on the stack, and means operatively connecting the base frame and the fork for causing a sliding movement of the fork on the guides during the latter portion of the movement of the hoisting frame to facilitate the delivery of hay upon the stack.

9. In a hay stacker, a base frame, a boom mounted at one end thereof and adapted to move to an upwardly inclined position, a hoisting frame mounted on the other end of the base frame and adapted to move to a perpendicular position when delivering hay, the hoisting frame intersecting the boom, guides on the free end of the hoisting frame, a fork movable on the guides, links operatively connecting the fork and the sides of the hoisting frame, hoisting means operatively connecting the boom and the hoisting frame to move the latter to said perpendicular position, whereby the fork may be positioned over the stack to deposit hay on the stack, a tilting frame mounted on the base frame and having supporting wheels, and means comprising a cable contrivance connecting the fork and the tilting frame which carries the wheels for moving the fork slidably on the guides and causing said tilting frame to tilt during the latter portion of the movement of the hoisting frame.

10. In a hay stacker, a base frame, a boom mounted at one end thereof and adapted to move to an upwardly inclined position, a hoisting frame mounted on the other end of the base frame and adapted to move to a perpendicular position when delivering hay, the hoisting frame intersecting the boom, guides on the free end of the hoisting frame, a fork movable on the guides, links operatively connecting the fork and the sides of the hoisting frame, hoisting means operatively connecting the boom and the hoisting frame to move the latter to said perpendicular position, whereby the fork may be positioned over the stack to deposit hay on the stack, and means operatively connecting the base frame and the fork for causing a sliding movement of the fork on the guides during the latter portion of the movement of the hoisting frame to facilitate the delivery of hay upon the stack, the links being adjustable on the sides of the hoisting frame to dispose the fork in different angular position on the guides, whereby the fork may move the full length of the guides during its hay deposit action.

11. In a hay stacker, a base frame, a boom mounted at one end thereof and adapted to move to an upwardly inclined position, a hoisting frame mounted on the other end of the base frame and adapted to move to a perpendicular position when delivering hay, the hoisting frame intersecting the boom, guides on the free end of the hoisting frame, a fork movable on the guides, links operatively connecting the fork and the sides of the hoisting frame, hoisting means operatively connecting the boom and the hoisting frame to move the latter to said perpendicular position, whereby the fork may be positioned over the stack to deposit hay on the stack, a tilting frame mounted on the base frame and having supporting wheels, means comprising a cable contrivance connecting the fork and the tilting frame which carries the wheels for moving the fork slidably on the guides and causing said tilting frame to tilt during the latter portion of the movement of the hoisting frame, and means connecting the cable contrivance and the boom to hold the hoisting frame in a position substantially intermediate the full movement of the hoisting frame, thereby causing the stacker to rest upon the wheels to facilitate moving the stacker.

12. A hay stacker comprising a base frame, supporting wheels, a frame carried by the supporting wheels and with which the base frame is pivotally connected, a boom, a hoisting frame, the hoisting frame and boom being pivotally connected at remote ends of the main frame, and operative connections between the wheel carried frame, the hoisting frame and the boom for the retention of the boom in the hoisting frame in the intermediate positions and the disposition of the bulk of the weight of the base frame and its connected parts upon said supporting wheels.

13. A hay stacker comprising a base frame, supporting wheels, a frame carried by the supporting wheels and with which the base frame is pivotally connected, a boom, a hoisting frame, the hoisting frame and boom being pivotally connected at remote ends of the main frame, a flexible member connecting the wheel carried frame with the hoisting frame, said flexible member at an intermediate point being provided with an eye, and a flexible member carried with the boom and provided with a terminal hook for engagement with said eye for the disposition of the hoisting frame and boom at an intermediate position and the disposition of the weight of the base frame upon said supporting wheels.

In testimony whereof he affixes his signature.

CHARLES N. TAYLOR.